UNITED STATES PATENT OFFICE.

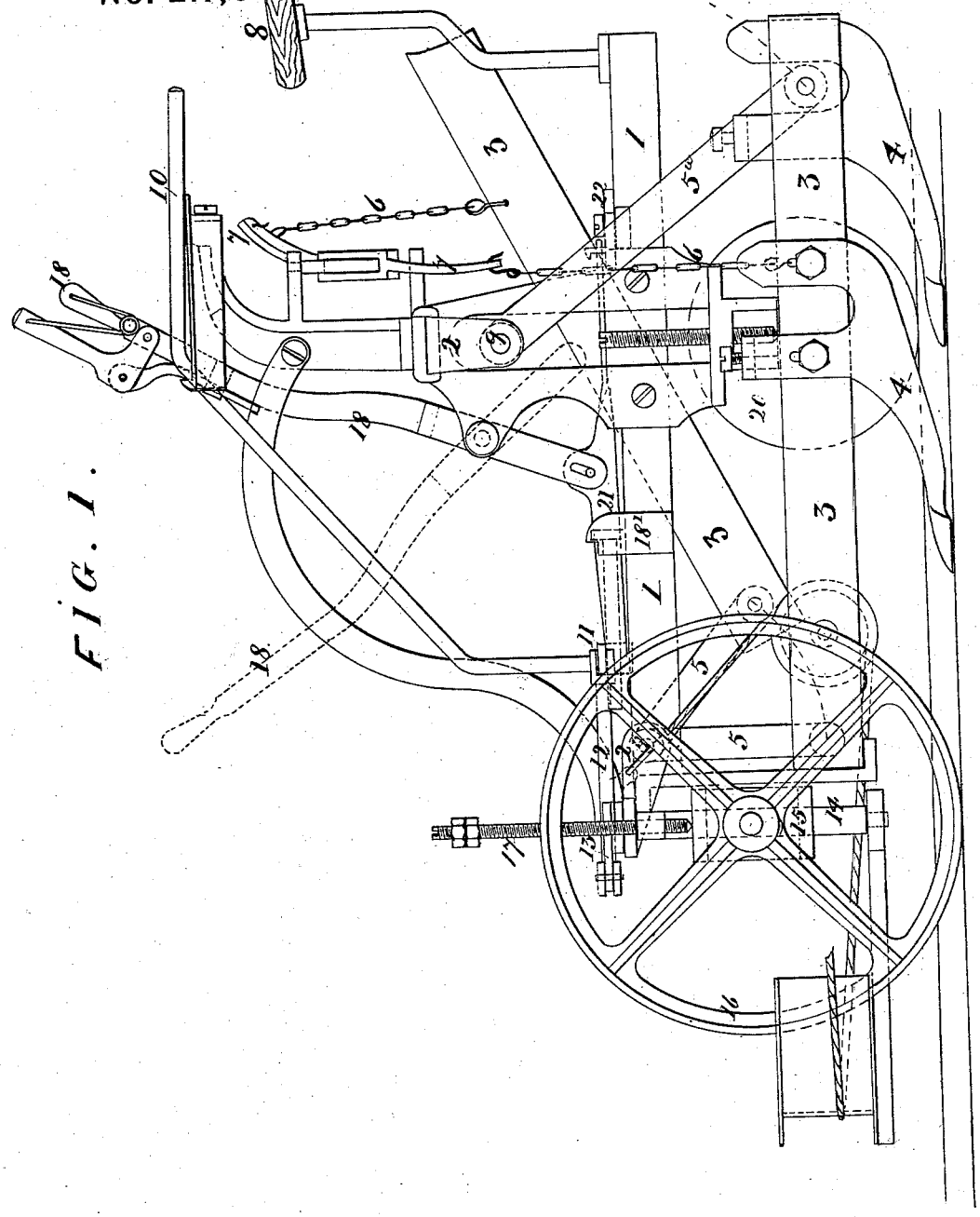

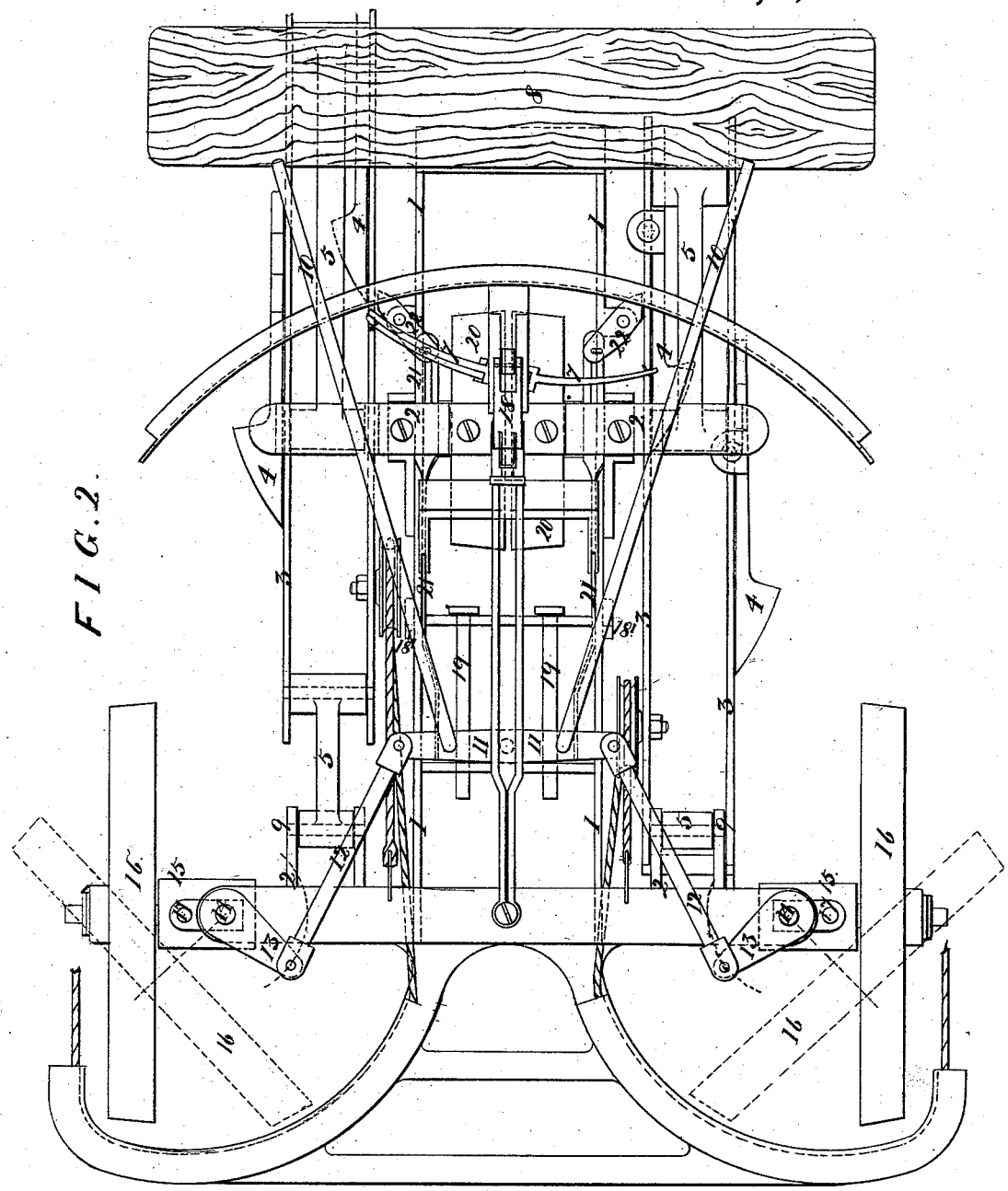

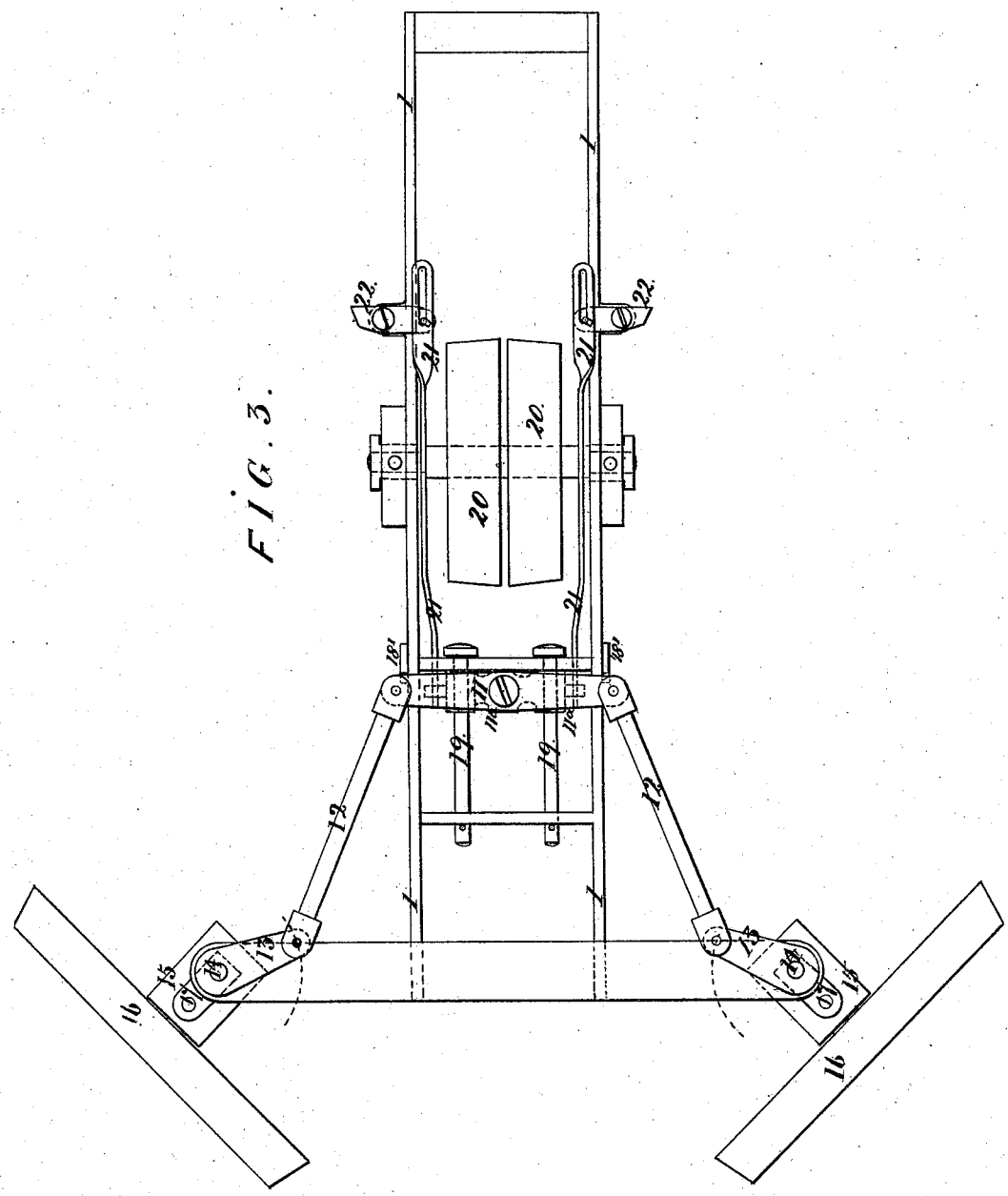

SAMUEL E. WOODS AND ARTHUR H. WHEWELL, OF LEEDS, COUNTY OF YORK, ENGLAND.

IMPROVEMENT IN AGRICULTURAL IMPLEMENTS.

Specification forming part of Letters Patent No. 217,036, dated July 1, 1879; application filed February 20, 1879; patented in England, December 15, 1876.

*To all whom it may concern:*

Be it known that we, SAMUEL EVERARD WOODS and ARTHUR HENRY WHEWELL, both of Leeds, in the county of York, England, have invented certain Improved Apparatus for Facilitating the Use of Agricultural Implements, of which the following is a specification.

This invention relates to improvements in apparatus for facilitating the use of skives, mold-boards, colters, and tines, harrows, and other like implements as interchanged and carried across the land upon a traversing framework or machine.

The first part of the invention relates to a combination of brackets, links, or connecting-rods used in the raising and lowering of the implements in use.

The second part relates to a combination of mechanism supporting the cultivating implements clear of or above the ground, and for steering and setting and locking the steering-wheels in such position as to insure the turning of the machine at the headlands.

Figure 1 is a side elevation of a machine embodying our invention. Fig. 2 is a plan of the same. Fig. 3 is a plan showing the steering, locking, and turning appliances only.

Similar letters of reference indicate corresponding parts in all the figures.

1 is the main framing of the machine, having brackets 2 2, to which the frame or bars 3 3, carrying the tines or colters 4 4, are attached or connected each by two links or connecting-rods, 5 5$^a$. The frames or bars 3 3 are likewise connected by the chains 6 6 and the balancing-beam 7, so that the attendant, seated at 8, may, by pressure of the foot, raise or depress either of the frames or bars 3 3 and implements 4 4, which thereon move on a curvilinear line on the center pins or studs, 9, of the bars 3 3, drawing the implements backward and from under and out of the soil. The one set of bars 3 3 and implements 4 4 balance the other set.

The steering is accomplished by means of the handle-levers 10 10, crosswise bar 11, connecting-rods 12 12, cranks 13 13, and vertical shafts 14 14, which latter pass through and turn the brackets 15 15 and wheels 16 16 in the required direction. On the said brackets 15 rest the ends of the adjusting-screws 17 17, for determining the height of the frames, and consequent depth of soil to be cut or operated upon.

When the machine is to be turned round, the attendant will partly raise both frames 3 and implements 4 clear of the ground, in which position they will be locked by means hereinafter described. A hand-lever, 18, connecting at its lower end with longitudinal sliding bars 21, is now moved forward to position shown by dotted lines, (see Fig. 1,) thus, by means of the draw-bars 21 21, drawing back the cross swivel-bar 11, with which they connect, and its carriage 11$^a$, (shown in dotted lines at Fig. 3,) along the guide-rods 19 19 to the stop-pieces 18', also drawing back the connecting-rods 12 12 and cranks 13 13, and placing the wheels 16 16 in position shown at Fig. 3, whereon the machine will turn in its own length on the center wheel, 20, as a pivot. The backward movement of the draw-bars 21 21 operates the pivoted stop-pieces 22 22, swinging them out and under the frames or bars 3 3, thereby holding them in the raised position.

We make no claim to the mode in which the colters, skives, or implements are attached to the frames, nor to the frames to which they are attached, nor to the application of interchangeable implements to one main carrying-frame, for we are aware such are not new; but

We claim as our invention—

1. The combination of the plow-beam 3 with the short front link, 5, and longer rear link, 5$^a$, and with the two brackets 2 2, in which said links are always free to vibrate, and with the lifting device 6, by which both ends of the plow-beam are simultaneously raised or lowered, all substantially as herein shown and described.

2. The combination, in an agricultural implement, of lever 18, draw-bars 21 21, cross-bar 11, carriage 11$^a$, guide-rods 19 19, connecting-rods 12 12, cranks 13 13, vertical shafts 14 14, and brackets 15 15, as and for purposes herein set forth.

3. The combination, in an agricultural implement, of lever 18, draw-bars 21 21, and frame lock-pieces 22 22 with pivoted plow-beams 3, substantially as described.

4. The combination, in an agricultural implement, of the balancing-beam 7, chains 6 6, and frames or bars 3 3, substantially as described.

SAMUEL EVERARD WOODS.
ARTHUR HENRY WHEWELL.

Witnesses:
 FRANK LEEMING,
 WALTER BRIERLEY.